United States Patent
Roecker

Patent Number: 5,968,577
Date of Patent: *Oct. 19, 1999

[54] CAKE BAKING PROCESS AND DEVICE

[75] Inventor: Hans Roecker, Homberg/Ohm, Germany

[73] Assignee: S & S Maschinenbau GmbH, Homberg/Ohm, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/647,896
[22] PCT Filed: Dec. 5, 1994
[86] PCT No.: PCT/EP94/04042
 § 371 Date: Jun. 5, 1996
 § 102(e) Date: Jun. 5, 1996
[87] PCT Pub. No.: WO95/15693
 PCT Pub. Date: Jun. 15, 1995

[30] Foreign Application Priority Data

Dec. 7, 1993 [DE] Germany .......................... 93 18 659 U
 Aug. 13, 1994 [DE] Germany .......................... 94 13 132 U
 Aug. 24, 1994 [DE] Germany .............................. 44 29 930
 Oct. 15, 1994 [DE] Germany .......................... 94 16 642 U

[51] Int. Cl.⁶ ..................................................... A21B 1/02
[52] U.S. Cl. ........................ 426/523; 126/152 R; 99/450; 249/53 R; 426/512; 426/89
[58] Field of Search ............................... 126/152 R, 160, 126/163 R, 153, 19 R, 337 R, 390, 332; 99/450, 426, DIG. 15, 422; 249/DIG. 1, 53 R, 155; 426/523, 512, 89

[56] References Cited

U.S. PATENT DOCUMENTS

| | | |
|---|---|---|
| 1,500,007 | 7/1924 | Sibbald . |
| 2,663,449 | 12/1953 | Smart ........................................ 220/22 |
| 3,109,361 | 11/1963 | Nicoli ........................................ 99/435 |
| 3,728,957 | 4/1973 | Polus ........................................ 99/433 |
| 4,065,583 | 12/1977 | Ahlgren .................................... 426/243 |
| 4,156,516 | 5/1979 | Oliver ........................................ 249/53 |
| 4,395,015 | 7/1983 | Reardon .................................... 249/115 |

(List continued on next page.)

FOREIGN PATENT DOCUMENTS

| | | |
|---|---|---|
| 0 235 037 | 9/1987 | European Pat. Off. . |
| 2 574 627 | 6/1986 | France . |
| 355 985 | 7/1922 | Germany . |
| 557 377 | 8/1932 | Germany . |
| 666 638 | 10/1938 | Germany . |
| 27 37 389 | 3/1979 | Germany . |
| 27 57 547 | 7/1979 | Germany . |
| 27 20 238 | 7/1980 | Germany . |
| 82 02 357 U | 9/1982 | Germany . |
| 30 07 266 | 3/1983 | Germany . |
| 29 05 384 | 5/1985 | Germany . |

(List continued on next page.)

OTHER PUBLICATIONS

Abstract of Japanese patent No. 60–153977 published Aug. 13, 1985.
Abstract of Japanese patent No. 55–030553 published Mar. 4, 1980.
Abstract of Japanese patent No. 01–098577 published Apr. 17, 1989.
Abstract of Japanese patent No. 55–033057 published Mar. 8, 1990.
Abstract of Japanese patent No. 54–017172 published Feb. 8, 1979.
Abstract of Japanese patent No. 50–130736 published Oct. 16, 1975.
Abstract of Japanese patent No. 63–163178 published Jul. 6, 1988.

Primary Examiner—Scott W. Houtteman
Attorney, Agent, or Firm—Foley & Lardner

[57] ABSTRACT

A process is disclosed for baking cakes in which a baking frame is placed on the oven grating. The space delimited by the baking frame and the oven grating is filled with cake dough and the cake is baked therein.

67 Claims, 12 Drawing Sheets

U.S. PATENT DOCUMENTS

| | | | |
|---|---|---|---|
| 4,452,419 | 6/1984 | Saleeba | 249/53 |
| 5,232,609 | 8/1993 | Prevost et al. | 249/102 |
| 5,351,608 | 10/1994 | Muchin et al. | 99/422 |
| 5,453,287 | 9/1995 | Close | 426/512 |
| 5,605,646 | 2/1997 | Colombo et al. | 249/134 |

FOREIGN PATENT DOCUMENTS

| | | |
|---|---|---|
| 88 10 7799 U | 2/1989 | Germany . |
| 28 40 538 | 3/1990 | Germany . |
| 40 00 565 | 8/1990 | Germany . |
| 40 23 206 | 6/1991 | Germany . |
| 91 14 841 U | 3/1992 | Germany . |
| 92 02 512 U | 6/1992 | Germany . |
| 93 06 001 U | 8/1993 | Germany . |
| 93 07 492 U | 9/1993 | Germany . |
| 93 18 369 U | 3/1994 | Germany . |
| 50-130736 | 4/1974 | Japan . |
| 55-30553 | 8/1978 | Japan . |
| 55-33057 | 8/1978 | Japan . |
| 54-17172 | 2/1979 | Japan . |
| 60-153977 | 10/1985 | Japan . |
| 63-163178 | 10/1988 | Japan . |
| 1-98577 | 6/1989 | Japan . |
| 660 669 | 6/1987 | Switzerland . |
| 663 515 | 12/1987 | Switzerland . |
| 2 272 151 | 5/1994 | United Kingdom . |
| WO 89/06926 | 8/1989 | WIPO . |

CAKE BAKING PROCESS AND DEVICE

DESCRIPTION

The invention relates to a cake baking process and device.

According to the prior art, single-part cake tins, for example square cake tins or gugelhupf tins, are used for baking cakes.

The prior art further includes two-part baking tins, so-called spring forms, which comprise a base sheet and a baking ring fastened resiliently around the latter.

The disadvantage with these tins is that a separate baking tin is necessary for each type and size of cake, with the result that a large number of different baking tins are accumulated in the household.

Furthermore, these baking tins always have to be greased prior to baking in order that the cake is released easily from the baking tin after baking.

The cake tins included in the prior art are placed on a baking sheet or the like for baking purposes. The disadvantage with this is that the baking sheet and then the baking tin have to be heated by the heat of the oven before the heat from the base penetrates to the cake mix.

Furthermore, the transfer of heat to the mix from the various directions is extremely non-uniform. At the base of the baking tin, the baking sheet and base of the baking tin have to be heated, and, at the side, the lateral part of the baking tin is heated. The surface of the cake mix is usually exposed, with the result that this surface is subjected to the strongest heating.

This is irrespective of whether baking is carried out with heat coming from the top or bottom or with hot air circulating throughout.

The technical problem of the invention is to specify a cake baking process in which only a very small number of auxiliary means are required in order to bake a large number of cakes which differ widely in shape and size, and in which heat is transferred to the cake mix uniformly or virtually uniformly.

Since all the baking frames are placed loosely on only one oven grating, the oven grating serves as base sheet for all the baking frames.

Furthermore, the baking frames are adjustable in size. This results in a further considerable saving in individual parts. For example, cakes with widely varying diameters, for example 20, 26, 28, 30 centimeters, can be baked using a circular baking frame. All intermediate sizes are also possible.

The size-adjustable rectangular baking frame can be used to bake, for example, different sizes of slab cakes without different baking tins being necessary for this purpose.

Since the mix is arranged directly on the oven grating, very good transfer of heat to the cake mix is achieved.

Furthermore, the baking frame may likewise be designed in the form of a grid, with the result that very good transfer of heat to the cake mix is achieved.

If the cake mix is of a somewhat runnier consistency, then baking foil may be provided between the oven grating and the baking frame. This baking foil only negligibly reduces the transfer of heat.

A further advantage of the process according to the invention is that greasing of the baking tins is dispensed with. The cake mix is placed directly on the oven grating or else directly on the baking foil. Greasing is not necessary in this case.

Greasing of the baking frame is likewise unnecessary. The cake can easily be released from the baking frame, after baking, using a knife.

The use of the oven grating with the baking frame has the further advantage that, while it is still in the baking frame, the cake can be placed on a cake stand, where it is covered, for example, with icing or cream. The baking frame serves as a cake ring here. Once the icing or the cream has become stiff, the baking frame may finally be removed. This dispenses with the separate provision of a cake ring, of which, furthermore, only circular ones are commercially available. It is not possible to obtain such cake rings for rectangular cakes or cakes of other basic shapes.

Use is advantageously made, as oven grating, of a metal sheet which has through-passages and on which the cake mix can be arranged. The heat which is necessary for baking can be channeled to the mix, by way of the oven grating, through the through-passages from the bottom. If the mix is very runny, so that it would flow through the through-passages, baking paper or baking foil can be positioned on the oven grating. This only negligibly obstructs the transfer of heat.

The oven grating may be arranged on the customary baking sheet in the oven or on the customary grid-like oven grating in the oven if the borders of the oven grating according to the invention are angled downward and likewise have through-passages. In the case of this design, the hot air can flow beneath the oven grating in order, from here, to pass, in turn, through the through-passages to the baking article placed on it.

The oven grating can replace the grid-like oven grating provided in the oven if it is of the same dimensions.

Any baking frame may be placed on the oven grating. The baking frame may be of widely varying shapes and dimensions. For example, it may be circular or rectangular. However, it may also be of any other shape.

The baking frame itself may, in turn, also have through-passages of the same shape as the oven grating. Consequently, the transfer of heat to the cake mix is considerably improved.

Use is advantageously made of baking frames which can be adjusted in size.

For this purpose, the round, size-adjustable baking frame has an open end. The two side surfaces of the open end of the baking frame overlap and are held together by two clamps. The mutually overlapping end surfaces can be pushed together or spread apart, with the result that the diameter of the baking frame is changed.

If the baking frame is rectangular, then it preferably has four segments which each comprise two side surfaces which are arranged at right angles with respect to one another. The side surfaces of in each case two segments overlap, this resulting in a rectangular baking frame when the four segments are plugged together.

The side surfaces are held together by means of displaceable clamps. Advantageously, in each case two clamps are provided on each side of the baking frame.

In each case one clamp may also be connected fixedly to a side surface. This has the advantage that the side surface cannot slip out of the clamp. Consequently, it is considerably easier to handle the frame.

If the baking frame is pushed together to give the smallest size, then the side surfaces of the individual segments overlap fully.

If the size of the baking frame is increased, then the side surfaces of the segments overlap only partially. When the baking frame is set to its largest size, the side surfaces overlap only at their ends.

When the size of the baking frame is increased or reduced, the side surfaces are guided by way of the clamps.

Advantageously, the size-adjustable baking frames have a graduated scale, with the result that, in the case of round baking frames, it is possible to read their diameter. In the case of the rectangular baking frame, a graduated scale is preferably provided on each side of the baking frame in order that a rectangular or square shape is achieved rather than a skewed shape.

In a further refinement, the invention relates to an oven grating as the carrier for a cake tin or for a piece of meat which is to be roasted, as well as for fruit which is to be dried, or the like.

According to the prior art, the oven grating comprises grid bars.

In order to bake a cake, according to the prior art, the cake tin which contains the mix to be baked is arranged, in the oven, on the oven grating. Cake tins have, on the one hand, a lateral surround, in order that the mix cannot spread out beyond the base surface of the tin during baking and, on the other hand, a closed base surface on which the cake mix rests. Baking tins of this type are placed either on the grating of the oven or on a metal tray arranged there, this usually being provided in the oven in order to collect the juice from pieces of meat during roasting.

It has been shown that, when using baking tins for baking cakes, the transfer of heat to the mix from the various directions is extremely non-uniform, to be precise both when the mix is baked with heat coming from the top or bottom and when the mix is baked with hot air circulating throughout. Since the surface of the baking article (cake mix) is usually exposed, this surface is always subjected to the strongest heating. The remainder of the mix which is to be baked, located on the base sheet of the baking tin and/or resting against the side borders of the tin, receive their baking heat only by transfer of heat by way of the baking tin, with the result that the mix is heated more slowly here. If the cake tin is not arranged on the customarily provided grating but, for the sake of convenience, is arranged on a metal tray for collecting the juice when a piece of meat is roasted, the heat additionally has to penetrate the metal tray in order to pass to the base sheet of the cake tin and, from here, to the mix which is to be baked. Since the conventional baking tins are non-transparent, it is not possible to establish whether a cake which is to be baked is receiving too much heat from the top, bottom or sides, in other words a fair amount of experience is required before it is possible, right away, to obtain cakes which display uniform browning and are baked thoroughly from all directions.

Furthermore, the transfer of heat, necessary for baking, to the mix by way of the tin and, if appropriate, by way of the metal tray prolongs the baking time, as a result of which heat energy is wasted.

The invention is also based on the technical problem of specifying an oven grating on which it is possible to arrange the cake mix directly, that is to say without a tin and base sheet, or else also pieces of meat for roasting such that heat is transferred uniformly or virtually uniformly from all directions to the article or articles placed on the oven grating, with the result that, when using the oven grating according to the invention, there is no heat loss due to transfer of the oven heat by way of the baking tin or by way of a juice-collecting tray.

Since use is now made, as oven grating, of a metal sheet which has through-passages and on which the cake mix can be arranged, the hot air which is necessary for baking can be channeled to the mix through these through-passages from the bottom. If the mix is very runny, so that it would flow through the through-passages, baking foil or baking paper can be positioned in a known manner on the metal sheet according to the invention. Such foil or such baking paper only negligibly obstructs the transfer of heat.

The metal sheet according to the invention may be arranged on the customary grid-like oven grating, and also on a baking sheet or juice-collecting tray provided in the oven, if the borders of the metal sheet are angled downward, and in a further refinement of the invention, likewise have through-passages. In the case of this design, the hot air can flow beneath the actual metal sheet in order, from here, to pass, in turn, through the through-passages to the article or articles placed on it.

The metal sheet designed as the oven grating can replace the oven grating provided in the oven if it is of the same dimensions. However, it may equally successfully be positioned on an oven grating provided there or on a juice-collecting tray provided there, without influencing the transfer of heat to the article or articles to be treated. In this case, the metal sheet according to the invention may also be of any other configuration. In other words, the metal sheet according to the invention constitutes, as it were, a separate base sheet for a cake tin or a separate base for a piece of meat which is to be roasted. However, the metal sheet may also be removed from the oven, after baking or roasting, with the article or articles resting on it and may be set down in order, for example, to allow a baked cake to cool, that is to say it may be used as a cooling rack.

The metal sheet has the further advantage that the surround for a cake, for example the cake ring, may easily be placed on it, if appropriate on the baking paper positioned on the metal sheet, with the result that the edge of the mix positioned on the metal sheet, and in particular of the finished baked article, is bounded in a known manner and attains a desired shape. In this application, the metal sheet serves, as it were, as a base sheet for the cake tin. According to the invention, the surround likewise has through-passages, with the result that, when such a surround is used, hot air can likewise flow to the mix from the side.

The through-passages in the metal sheet and in the angled side borders of the metal sheet, as well as those in the surround, may be of absolutely any shape. It is advantageous to configure the through-passages such that only narrow webs, which provide the metal sheet with sufficient rigidity, remain between them, with the result that the metal sheet does not warp and/or become misshapen, but rather, even after a relatively long period of usage, can be arranged in the oven in a stable manner. The angled borders of the metal sheet make it possible to arrange the baking tin, without impairing its baking action, on a metal base in the oven, for example on the abovementioned juice-collecting tray, without the supply of heat to the mix being obstructed as a result. Moreover, the bent side borders reinforce the metal sheet, with the result that it is fully flexurally rigid.

In a further refinement, the invention relates to a baking frame which is intended for baking cakes and is placed on an oven grating.

As described above, a baking frame may be placed on an oven grating, with the result that the oven grating forms the base sheet for the surround which can be placed thereon. In this embodiment, widely varying sizes and outer shapes of baking frames can be placed on one and the same oven grating. However, in each case a separate baking frame is required for each shape and size of cake. A number of cake tins are obtained with one oven grating and the various baking frames. These cake tins have the advantages mentioned above.

Recipes in cookery books specify quantities of mix for different sizes of cake. For example, instructions are given to the effect that the prepared mix should be introduced into a cake tin with a diameter of 26, 28 or 30 cm, or that rectangular or square cakes are to be baked in various sizes of tin, for example 30×30 cm or 35×35 cm.

According to the prior art, baking tins in a number of sizes, that is to say a large number of different baking tins, are required for this purpose.

However, it is also common nowadays to bake two smaller cakes with a diameter of, for example, 20 cm or less instead of one large cake. According to the prior art, once again separate baking tins are also required for this purpose.

The invention is also based on the technical problem of specifying a baking frame which can be used for cakes of different dimensions and which, furthermore, can be easily handled as far as setting the size is concerned.

This technical problem is solved by the features of the preamble and of the characterizing part of claim 42.

In a further development of the invention, then, a baking frame which can be adjusted in size is specified. This has the advantage that only one baking frame is necessary for cakes of different dimensions.

The baking frame according to the invention may be rectangular, but it also may be round.

The rectangular baking frame comprises four segments which, in turn, each comprise two side surfaces which are arranged at right angles with respect to one another.

The side surfaces of in each case two segments overlap, this resulting in a rectangular baking frame when the four segments are plugged together.

The side surfaces are held together by means of loosely displaceable clamps. Advantageously, in each case two clamps are provided on each side of the baking frame. In each case one clamp may also be connected fixedly to a side surface. This has the advantage that the side surface cannot slip out of the clamp. Consequently, it is considerably easier to handle the frame.

If the baking frame is pushed together to give the smallest size, then the side surfaces of the individual segments overlap fully.

If the size of the baking frame is increased, then the side surfaces of the segments overlap only partially. When the baking frame is set to the largest size, the side surfaces overlap only at their ends.

When the size of the baking frame is increased or reduced, the side surfaces are guided by way of the clamps.

Since each of the four sides of the rectangular baking frame can be adjusted as required, a graduated scale is provided on each side of the baking frame in order for it to be possible to set the baking frame as accurately as possible in a rectangular or square shape in order that cakes with a skewed shape are avoided.

The graduated scale is preferably provided on the outside of the baking frame. The graduated scale may comprise a line scale which is arranged on the outer surface of the inner side surface of the two mutually overlapping side surfaces. When setting the size of the baking frame, the outer side surface may thus be displaced, with its end, up to the desired line of the graduated scale. If this setting is carried out on all four sides of the baking frame, this achieves the desired rectangular or square shape without the shape being skewed.

The baking frame may also be round in shape. A baking ring with an open end is provided for this purpose. The two side surfaces overlap, in turn, at the open end of the baking ring and are held together by two clamps. The baking frame may then be pushed together or spread apart to any size.

Again, here too, the outer surface of the baking frame is provided with a graduated scale from which it is easy to read the diameter of the baking frame at any point in time.

In a further refinement, the invention relates to a baking frame which is intended for baking cakes and can be placed on an oven grating.

The abovementioned baking frames are in various shapes, for example are round in shape or have a number of sides, as are known in the case of commercially available cake tins.

However, the baking tins may also be in the form of a star or rosette.

The baking frames are placed on an oven grating. Cake mix is introduced, for baking purposes, into the space bounded by the baking frame and the oven grating.

The baking tins may be adjustable in size, with the result that only a small number of baking frames is required and a large number of different cakes can be baked with this small number of baking frames.

The invention is also based on the technical problem of specifying a baking frame with which cakes of widely varying shapes can be baked without a separate baking frame being necessary for each shape of cake.

Since a bracket, which grips on the outer surfaces of the baking frame by means of its legs, is provided for the cake tin, the baking frame is compressed, for example, in its center and this shape is fixed by means of the bracket.

The shape of the baking frame can be varied in this manner with the aid of the bracket.

If the basic shape of the baking frame has indents, that is to say if the baking frame is designed, for example, in the form of a star or rosette, then the bracket engages in these indents and the baking frame retains its shape fixed by the bracket.

If the baking frame provided has no indents, for example if the baking frame is round or rectangular, then it advantageously has securing means in which the legs of the bracket engage.

In order to change the shape of the baking frame, it is also possible to provide a plurality of brackets, for example two brackets, which are arranged simultaneously on the baking frame.

The baking frame advantageously consists of spring band steel. The advantage of this is that, once the bracket or brackets has or have been removed, the baking frame returns to its original shape again and can then be reused either in this shape or in another, changed shape, depending on the arrangement or design of the bracket.

Advantageously, the base side of the bracket is adjustable in length. This makes it possible to carry out a large number of changes in shape of the baking frame using only one bracket and one baking frame.

Further details of the invention can be gathered from the subclaims.

Exemplary embodiments of the invention are represented in the drawing, in which.

Figure 1:
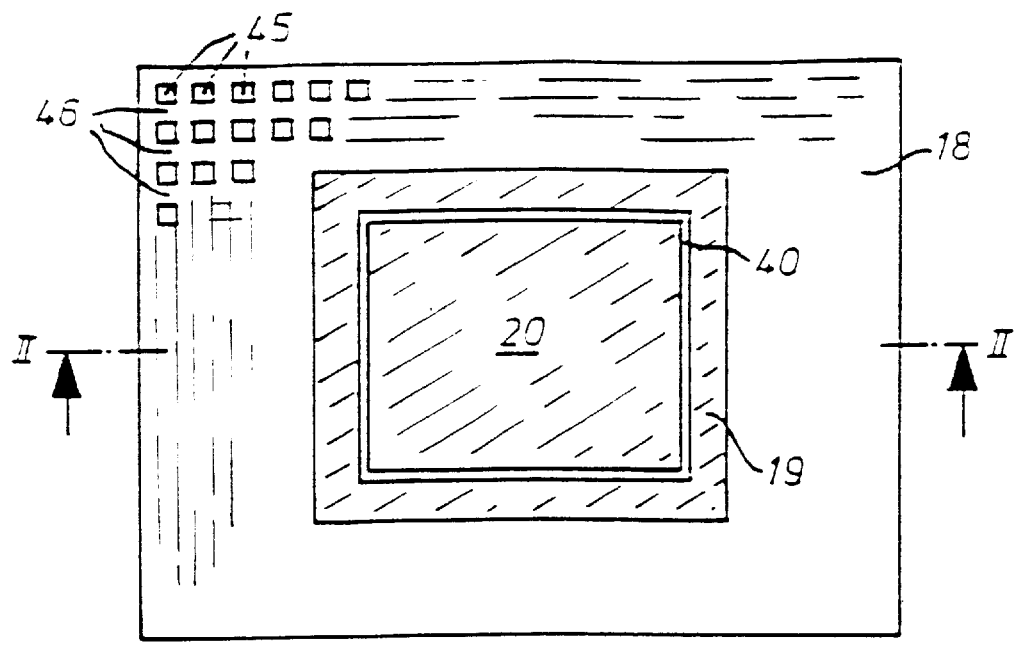
FIG. 1 shows a first exemplary embodiment.
Figure 2:
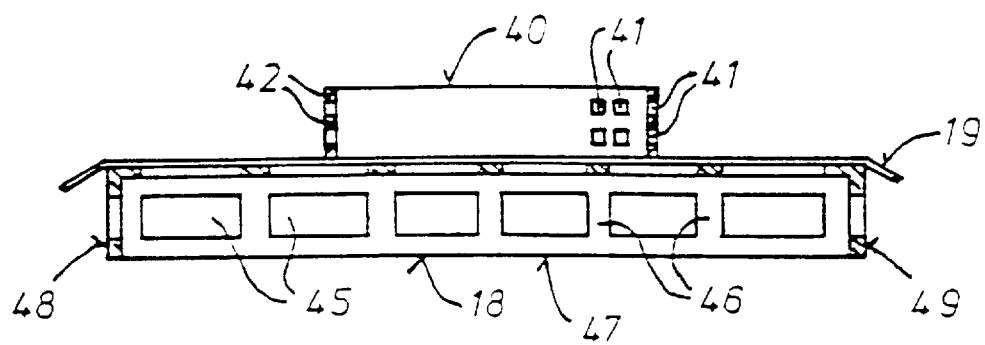
FIG. 2 shows a section along line II—II of FIG. 1.

FIG. 1 shows an oven grating (18) with through-passages (45) and webs (46). In order to work with a relatively runny mix, baking foil (19) is positioned on the oven grating (18). A rectangular baking frame (40) is arranged on the baking foil (19). Cake mixture is introduced into the interior (20), the latter being bounded by the baking foil (19) and the baking frame (40). The baking frame (40) likewise has through-passages (41) and webs (42) according to FIG. 2.

The transfer of heat to the cake mix is considerably improved by the through-passages (41, 45) in the baking frame (40) and in the oven grating (18). Consequently, uniform transfer of heat is achieved, on the one hand, and the baking time is shortened considerably, on the other hand.

Figure 3:
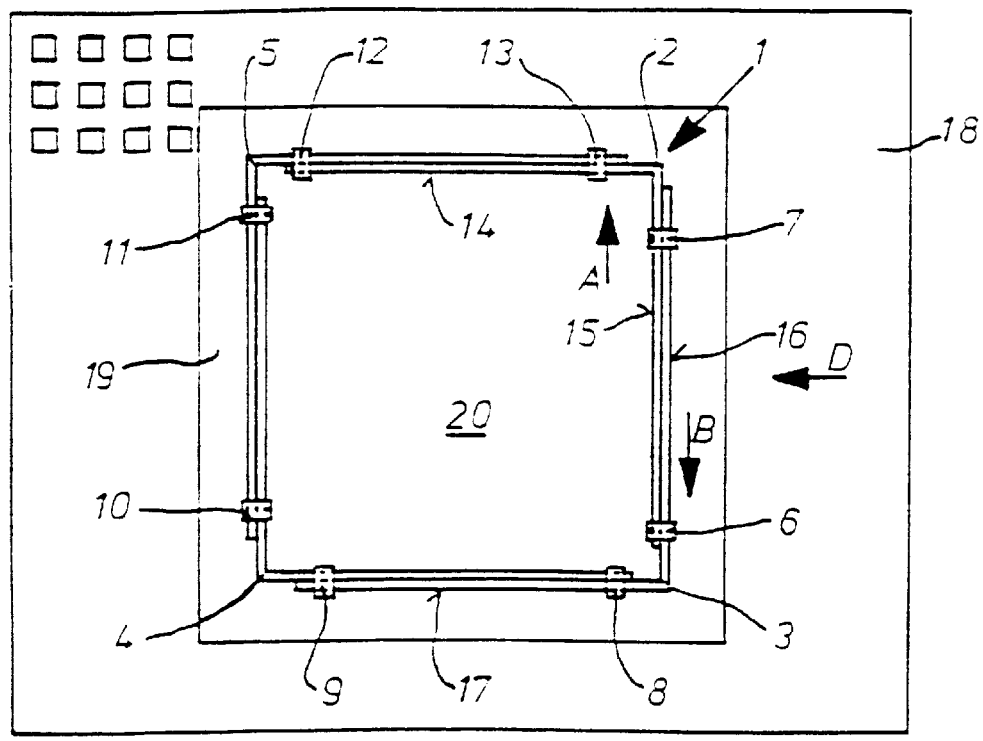
FIG. 3 shows a further exemplary embodiment.

FIG. 3 shows a rectangular baking frame (1) which can be adjusted in size. The baking frame (1) comprises segments (2, 3, 4, 5). The segments (2, 3) have side surfaces (14, 15; 16, 17) which are at right angles with respect to one another.

The side surfaces (15, 16) of the segments (2, 3) overlap and are held together by clamps (6, 7).

The clamps (6, 7) are stressed such that the side surfaces (15, 16) can be displaced with respect to one another and, after displacement, remain in the set position.

The segments (4, 5) likewise have side surfaces which are perpendicular with respect to one another and overlap with the side surfaces of the adjacent segments and are connected by clamps (8 to 13).

The baking frame (1) is placed on the oven grating (18). For working with relatively runny cake mix, the foil (19) is provided between the baking frame (1) and oven grating (18).

Figure 4:
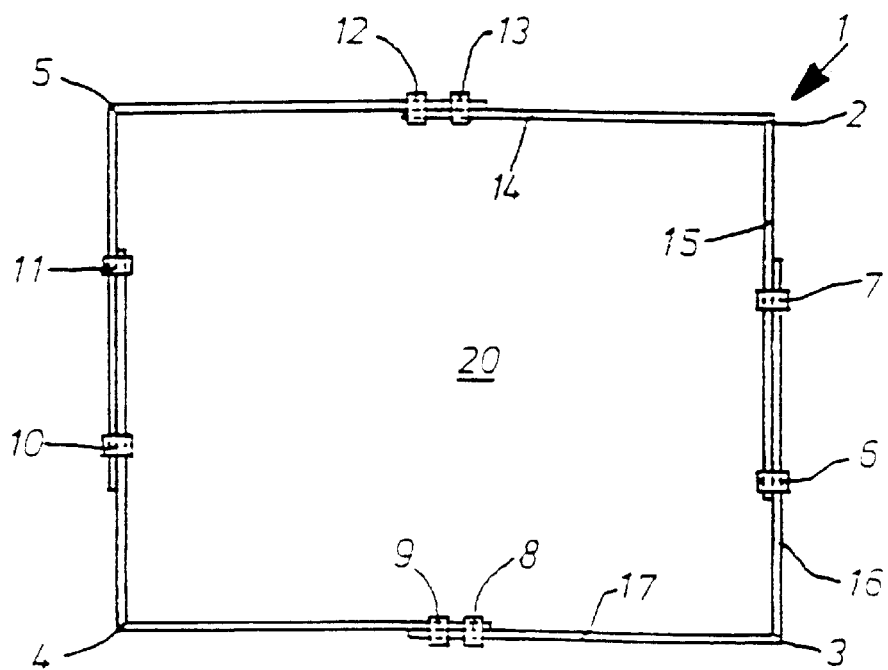
FIG. 4 shows a modified exemplary embodiment according to FIG. 3.

In order to increase the size of the baking frame (1), the mutually overlapping regions of the side surfaces (15, 16) are, according to FIG. 4, reduced by the segment (2) being displaced in the direction of arrow A and the segment (3) being displaced in the direction of arrow B. In order to obtain a uniform rectangle, this operation is likewise carried out for the other side surfaces (4, 5).

Figure 5:
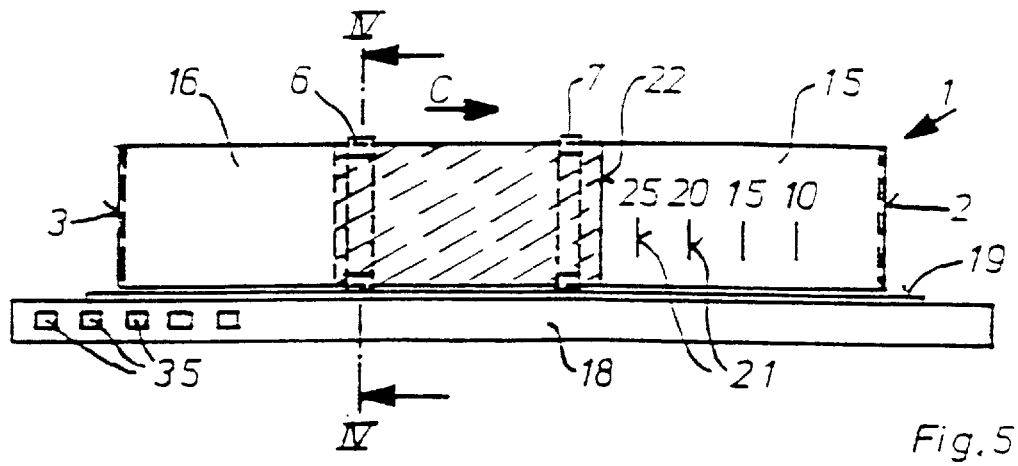
FIG. 5 shows a view in the direction of arrow of FIG. 3.

FIG. 5 shows the baking frame (1) placed on the oven grating (18). The baking foil (19) is provided between the oven grating (18) and the baking frame (1).

The side surfaces (15, 16) of the segments (2, 3) overlap in the cross-hatched region and are held together by the clamps (6, 7).

The inner surfaces of the side surfaces (16, 17) rest against the outer surface of the side surface (15). The side surface (15) has a graduated scale (21) on its outer surface, with the aid of which scale the side surface (16) can be displaced into the desired position relative to the side surface (15).

The graduated scale (21) is a line scale, with the result that the edge (22) of the side surface (16) can be made to coincide with the lines of the graduated scale (21).

The graduated scale (21) advantageously gives measurements in centimeters for the size of a side length of the baking frame.

The clamp (6) is connected fixedly to the side surface (15). The clamp (7) engages in a loosely displaceable manner around the two side surfaces (15, 16).

Figure 6:
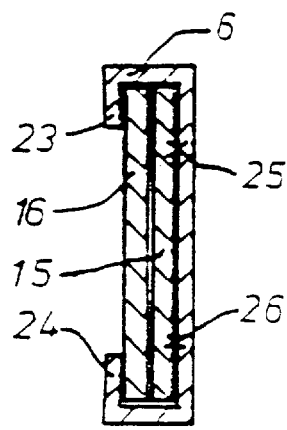
FIG. 6 shows a section along line VI—VI of FIG. 5.

FIG. 6 shows the clamp (6), which engages around the side surfaces (15, 16) by means of its ends (23, 24). The clamp (6) is spot-welded to the side surface (15) at the points (25, 26).

Figure 7:
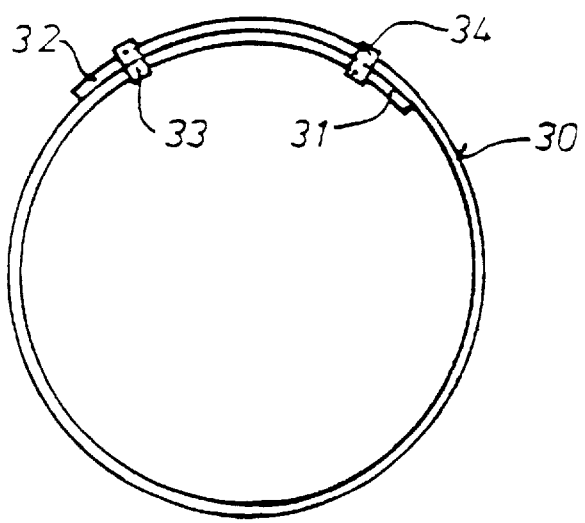
FIG. 7 shows a modified exemplary embodiment.

FIG. 7 shows a baking frame (30) whose end surfaces (31, 32) overlap. The end surfaces (31, 32) are held together with the aid of clamps (33, 34).

If the overlapping region of the end surfaces (31, 32) of the baking frame (30) is increased, then the diameter of the baking frame (30) is reduced.

A graduated scale with measurements in centimeters is advantageously provided on the side surface (31) in order that it is possible to read the diameter of the baking frame (30) directly.

The oven grating is not restricted to use as a base sheet for a cake which is to be baked. It is also possible to arrange on it a piece of meat which is to be roasted, this piece of meat then likewise being heated uniformly from all directions even if the customary juice-collecting tray is arranged beneath the oven grating according to the invention.

The openings in the metal sheet are relatively small, with the result that it is also possible for fruit, vegetables and the like to be dried on the metal sheet. When it has been removed from the oven, the oven grating according to the invention also serves as a cooling rack, for example for a baked cake.

The advantage of the process according to the invention is that, on the one hand, it is possible, by way of the oven grating with the through-passages and webs, for the heat to be transferred directly, or indirectly by way of baking foil, right to the cake mix.

Furthermore, any baking frame can be placed on the oven grating, with the result that the oven grating serves as a base sheet for a wide variety of cake tins. When using size-adjustable baking frames, the number of auxiliary means which are used for baking a wide variety of cakes is reduced to a minimum in this way.

Furthermore, the oven grating is extremely versatile and can be used as a base sheet for a wide variety of cake tins, as a roasting grating or as a cooling rack.

Figure 8:
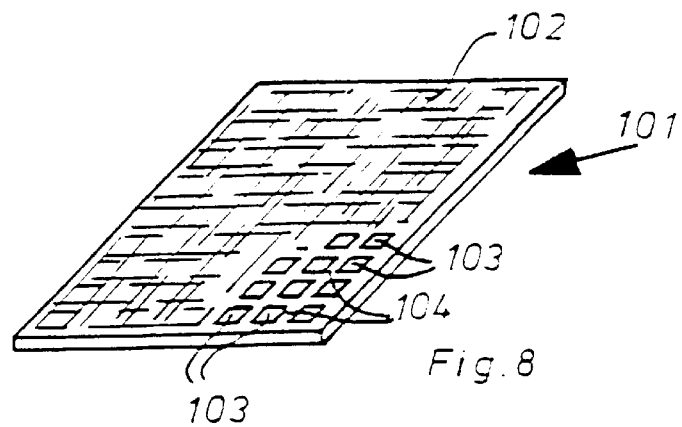
FIG. 8 shows a perspective representation of a modified exemplary embodiment.

According to FIG. 8, the oven grating designated in general by (101) comprises a metal sheet (102) which has a multiplicity of through-passages (103). According to FIG. 8, the through-passages (103) have a rectangular cross-section, with the result that narrow webs (104), which are strong enough for the metal sheet (102) to have sufficient flexural rigidity, remain between the through-passages (103).

In the case of this design, the metal sheet (102) can be arranged in the oven on an existing grating. The mix arranged on the metal sheet (102) is then heated virtually uniformly from all directions.

Figure 9:
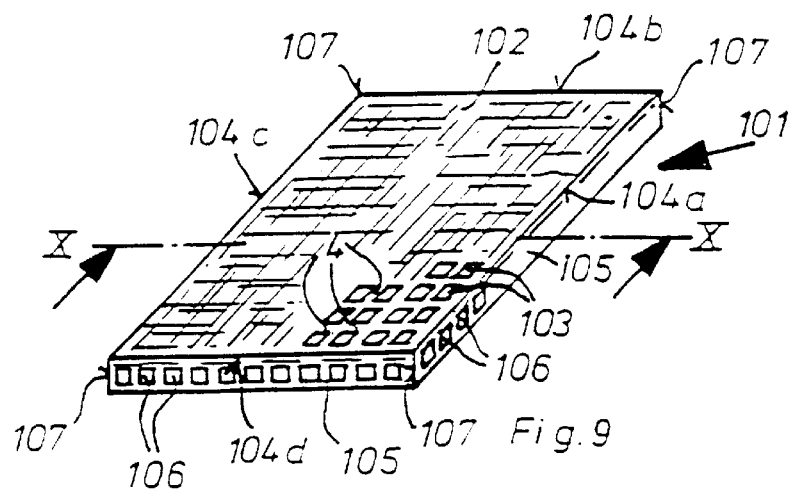
FIG. 9 shows a further exemplary embodiment.
Figure 10:
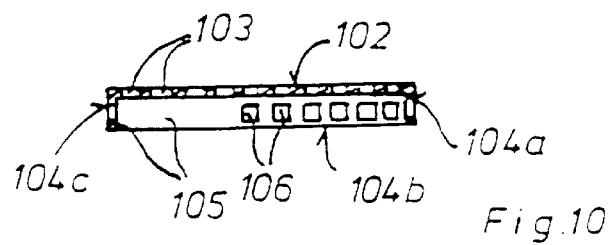
FIG. 10 shows a section along line X—X of FIG. 9.

According to FIGS. 9 and 10, the side borders (105) of the metal sheet (102), in a further refinement of the invention, are angled downward at right angles, to be precise along the web lines (104a, 104b, 104c and 104d).

The borders (105), in turn, have through-passages (106), advantageously on all four sides, with the result that the hot air can flow beneath the metal sheet (102) during baking even when said metal sheet is resting, for example, on a metal tray which does not have any openings for the through-passage of air.

Figure 11:
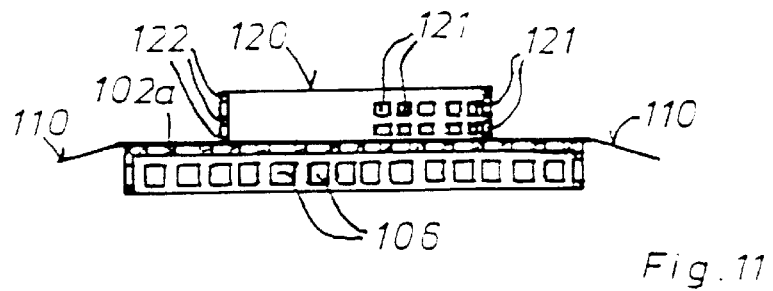
FIG. 11 shows a further exemplary embodiment.

According to FIG. 11, baking paper (110) is positioned on the metal sheet (102) for the purpose of working with a relatively runny mix. The baking paper only negligibly obstructs the transfer of heat to the base of the baking article. If the mix is of such a runny consistency that it may run off to the sides, a surround (120), which is designed according to FIG. 11 as a removable cake-tin surround, can be positioned on the paper. However, unlike a conventional cake surround, the surround (120) likewise has, according to the invention, through-passages (121) between which, in turn, webs (122) are provided. In the case of this design, there is likewise no obstruction to the transfer of heat to the cake mix from the side. In the case of this design, the metal sheet (102) serves as a base sheet (102a) for a "cake tin".

The surround need not be designed in the form of a circle. It may be of any other shape.

The advantage of the invention is that the oven heat can pass directly from all directions to the baking article.

The oven grating according to the invention is not restricted to use as a base sheet (102a) for a cake which is to be baked. It is also possible to arrange on it a piece of meat which is to be roasted, this piece of meat then likewise being heated uniformly from all directions even if the customary juice-collecting tray is arranged beneath the oven grating according to the invention.

The openings in the metal sheet are relatively small, with the result that it is also possible, for example, to dry fruit, vegetables and the like on the metal sheet. When it has been removed from the oven, the oven grating according to the invention also serves as a cooling rack, for example for a baked cake.

The advantage of the oven grating according to the invention is that, on the one hand, the oven heat can pass uniformly from all directions to the article or articles placed on the grating, and that the oven grating according to the invention is extremely versatile and can be used as a base sheet for a cake tin, as a roasting grating or as a cooling rack.

Figure 12:
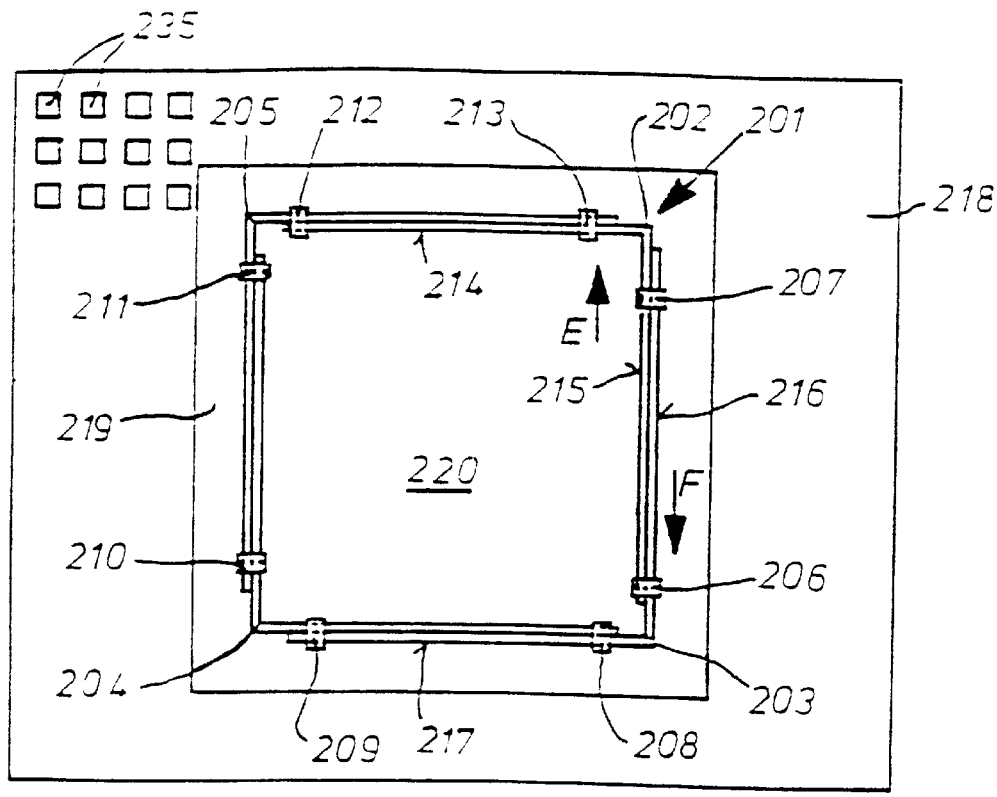
FIG. 12 shows a plan view of a rectangular baking frame.

FIG. 12 shows a rectangular baking frame (201) which comprises segments (202, 203, 204, 205).

The segments (202, 203) have side surfaces (214, 215; 216, 217) at right angles with respect to one another.

The side surfaces (215, 216) of the segments (202, 203) overlap and are held together by clamps (206, 207).

The clamps (206, 207) are stressed such that the side surfaces (215, 216) can be displaced with respect to one another and, after displacement, remain in the set position.

The segments (204, 205) likewise have side surfaces which are perpendicular with respect to one another, overlap with the side surfaces of the adjacent segments and are connected by clamps (208 to 213).

The baking frame (201) is placed on an oven grating (218). The oven grating (218) has a multiplicity of openings (235) through which the hot air passes directly to the base of the cake mix. In order that cake mix which is of a somewhat more runny consistency does not flow through the openings (235) of the oven grating (218), foil (219) is provided between the baking frame (201) and oven grating (218).

The cake mix can be introduced for baking purposes into the interior (220) of the baking frame (201).

Figure 13:
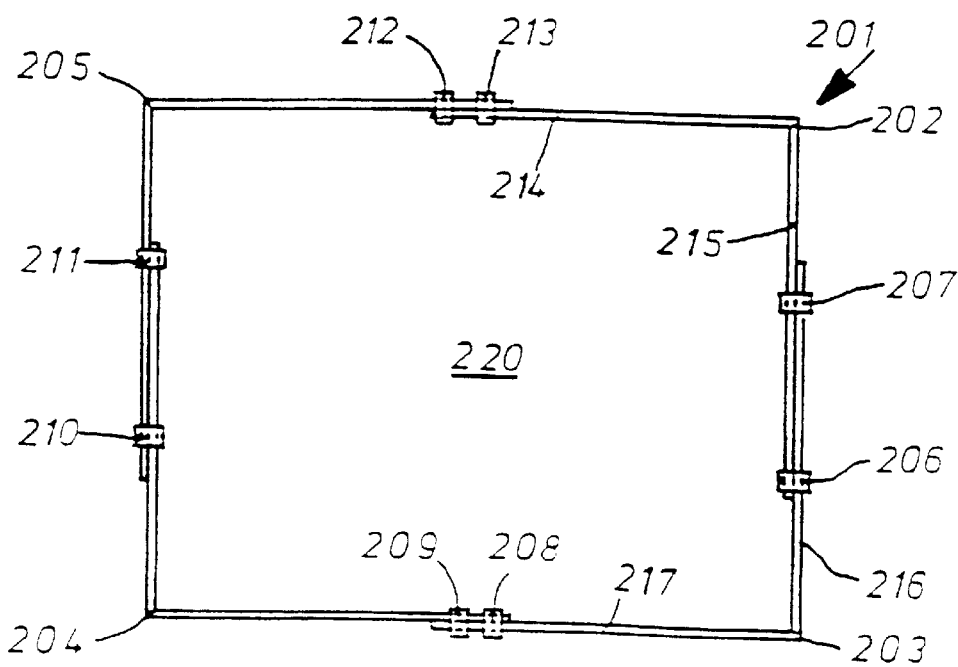
FIG. 13 shows a plan view of an enlarged rectangular baking frame.

In order to increase the size of the baking frame (201), the mutually overlapping regions of the side surfaces (215, 216) are, according to FIG. 13, reduced by the segment (202) being displaced in the direction of arrow E and the segment (203) being displaced in the direction of arrow F (FIG. 12). In order to obtain a uniform rectangle, this operation is also carried out for the other segments (204, 205).

Figure 14:
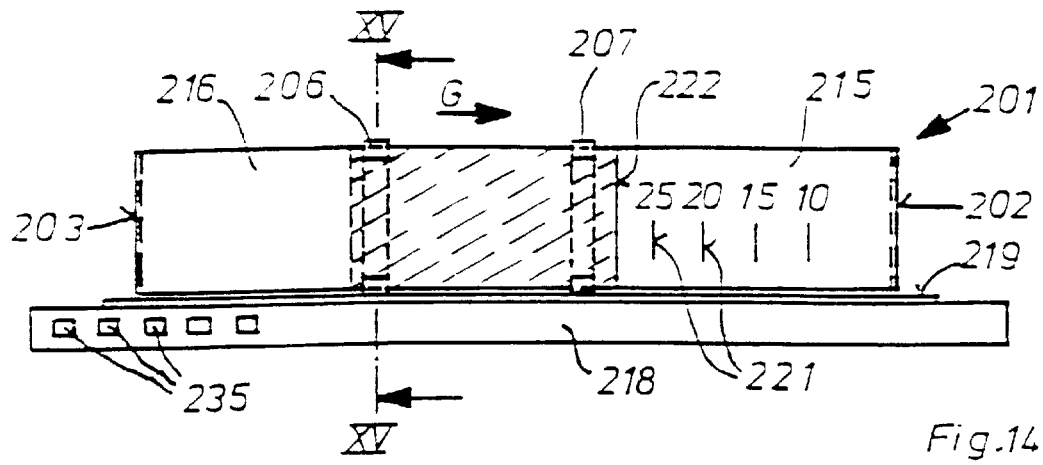
FIG. 14 shows a side view of the baking frame from FIG. 12.

FIG. 14 shows a side view of the baking frame (201) placed on the oven grating (218). The baking foil (219) is provided between the oven grating (218) and the baking frame (201).

The side surfaces (215, 216) of the segments (202, 203) overlap in the cross-hatched region and are held together by the clamps (206, 207).

The inner surface of the side surface (216) rests against the outer surface of the side surface (215). The side surface (215) has a graduated scale (221) on its outer surface, with the aid of which scale the side surface (216) can be displaced into the desired position relative to the side surface (215).

The graduated scale (221) is a line scale, with the result that the edge (222) of the side surface (216) can be made to coincide with the lines of the graduated scale (221).

The graduated scale (221) advantageously gives measurements in centimeters for the size of a side length of the baking frame (201).

The clamp (206) is connected fixedly to the side surface (215). The clamp (207) engages in a loosely displaceable manner around the two side surfaces (215, 216).

Figure 15:
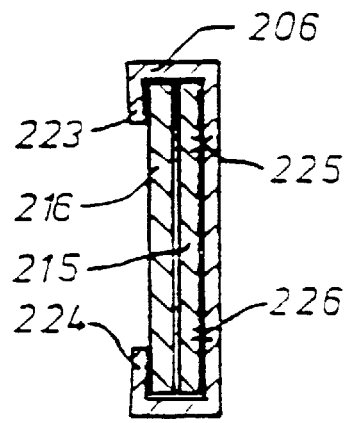
FIG. 15 shows a section along line XV—XV of FIG. 14.

FIG. 15 shows the clamp (206), which engages. around the side surfaces (215, 216) by means of its ends (223, 224). The clamp (206) is spot-welded to the side surface (215) at the points (225, 226).

Figure 16:
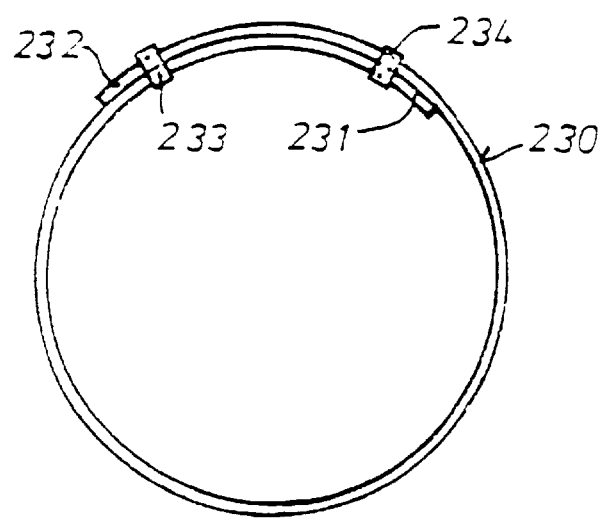
FIG. 16 shows a plan view of a round baking frame.

FIG. 16 shows a baking frame (230) which comprises a flexible sheet-metal strip and whose end surfaces (231, 232) overlap. The end surfaces (231, 232) are held together with the aid of clamps (233, 234).

If the overlapping region of the end surfaces (231, 232) of the baking frame (230) is increased, then the diameter of the baking frame (230) is reduced.

A graduated scale with measurements in centimeters is, in turn, advantageously provided on the end surface (231) in order that it is possible to read the diameter of the baking frame (230) directly.

Figure 17:
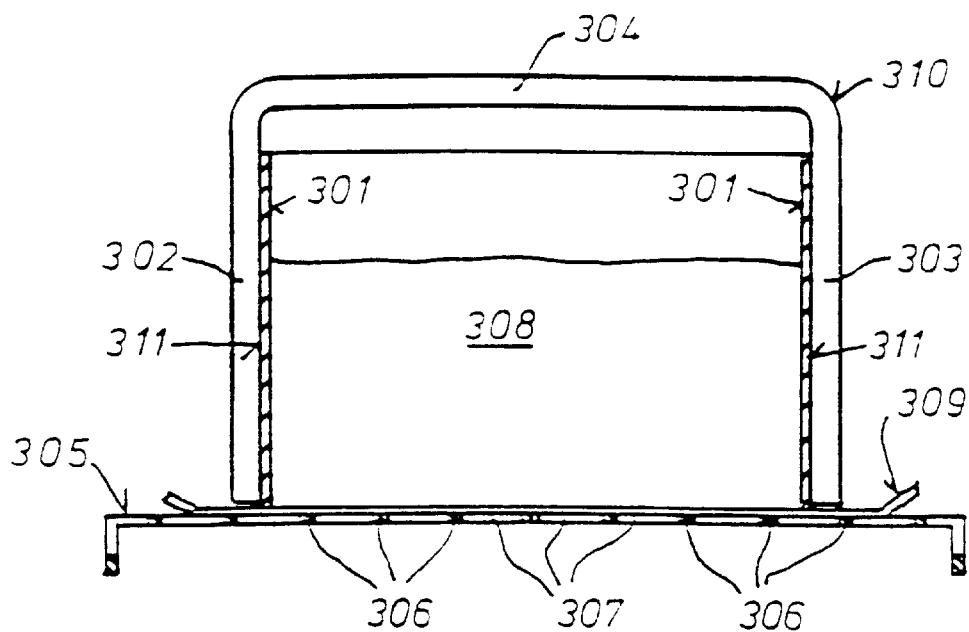
FIG. 17 shows a longitudinal section through a baking frame with a bracket.

FIG. 17 shows a baking frame (301) arranged on an oven grating (305). Cake mix (308) is introduced between the baking frame (301) and oven grating (305).

A bracket (310) is arranged on the outer surfaces (311) of the baking frame (301). The bracket (310) has legs (302, 303) and a base side (304). The legs (302, 303) rest against the outer surfaces (311) of the baking frame (301).

The cake mix (308) is introduced, for baking purposes, into the area bounded by the baking frame (301) and the oven grating (305). In order that there can be good transfer of the oven heat to the mix (308), the oven grating (305) has through-passages (307) and webs (306). In order that the cake mix cannot flow out downward through the through-passages (307) of the oven grating (305), baking foil (309) is provided.

Figure 18:
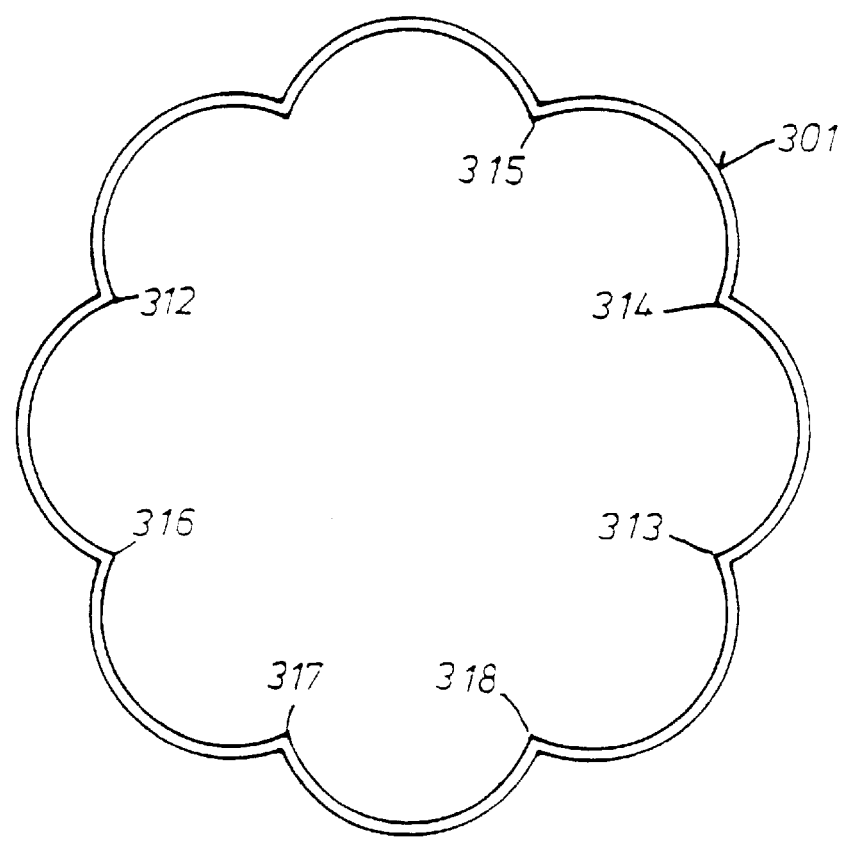
FIG. 18 shows a plan view of the basic shape of a baking frame.

FIG. 18 shows a baking frame which is in the form of a rosette and has an essentially round basic shape. According to FIG. 19, the shape of the baking frame (301) is changed with the aid of the bracket (310), with the result that an essentially rectangular basic shape is provided. The legs (302, 303) of the bracket (310) rest against the outer surfaces (311) of the baking frame (301) and thus retain the baking frame in its changed shape.

In this arrangement, the base side (304) of the bracket (310) is located above the baking frame (301) and can be used, at the same time, as a handle for carrying the baking frame (301). In this arrangement, the bracket (310) rests in a frictionally locking manner against the baking frame (301).

Figure 19:
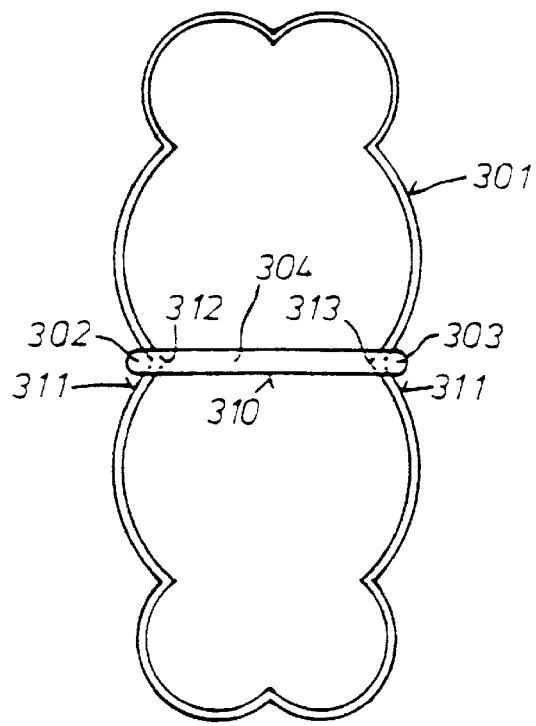
FIG. 19 shows a plan view of the modified shape of a baking frame.

According to FIG. 19, the bracket (310) is arranged in the center of the baking frame and engages in symmetrically opposite indents (312, 313) of the baking frame (301).

Figure 20:
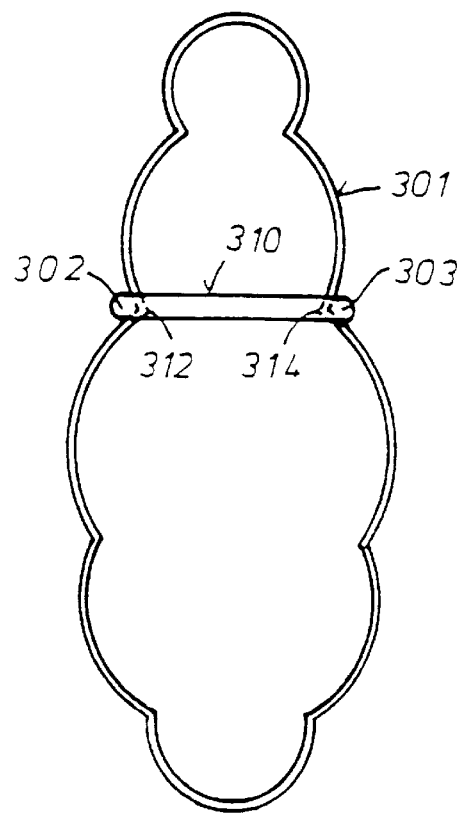
FIG. 20 shows a plan view of a modified exemplary embodiment.

According to FIG. 20, the legs (302, 303) of the bracket (310) engage in indents (312, 314) of the baking frame, with the result that the baking frame (301) has an essentially conical basic shape.

Figure 21:
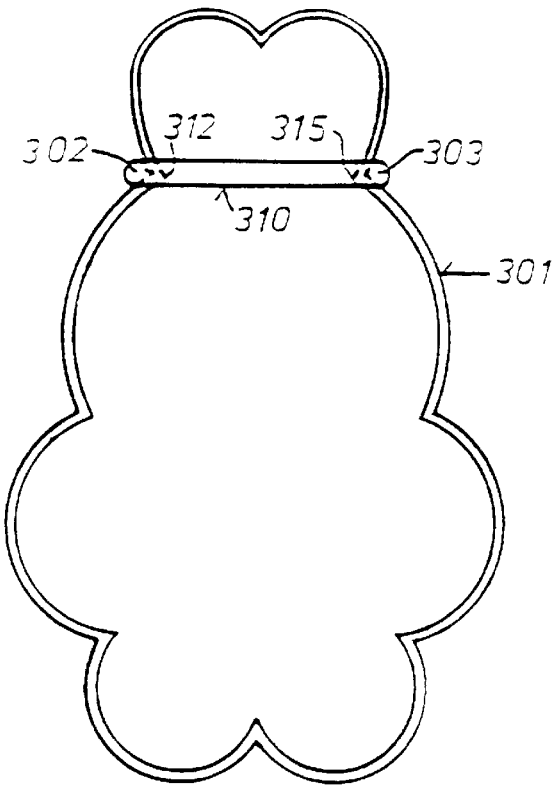
FIG. 21 shows a plan view of a modified exemplary embodiment.

According to FIG. 21, the baking frame (301) has a shape which has been modified again. The bracket (310) engages in indents (312, 315) of the baking frame (301) by means of its legs (302, 303). Since there is only one other indent arranged between the indents (312, 315), the top part of the baking tin is narrower and the bottom part of the baking tin is wider.

Figure 22:
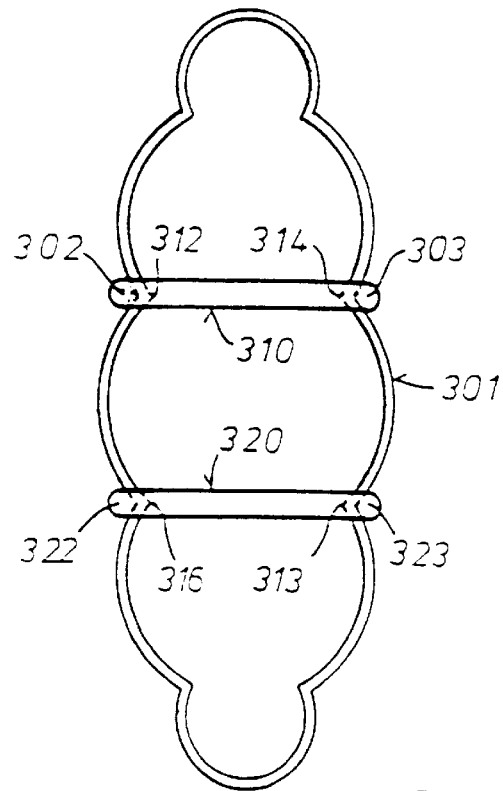
FIG. 22 shows a plan view of a modified exemplary embodiment.

According to FIG. 22, the shape of the baking frame (301) is changed by two brackets (310, 320) with legs (302, 303; 322, 323). The bracket (310) engages in indents (312, 314) by means of its legs (302, 303). The bracket (320) engages in indents (316, 313) by means of its legs (322, 323). This achieves an elongate form of the rosette-shaped baking frame. This form can be used, for example, as a tin for baking Stollen.

Figure 23:
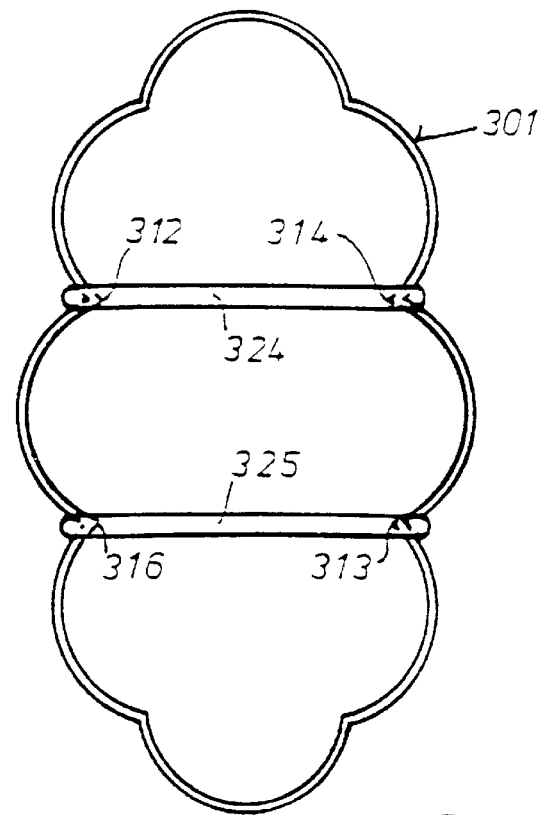
FIG. 23 shows a plan view of a modified exemplary embodiment.

FIG. 23 shows the baking frame (301) with brackets (324, 325) engaging in its indents (312, 314; 313, 316). The brackets (324, 325) have a longer base side than the brackets (310, 320), with the result that the baking frame (301) is wider than that represented in FIG. 22.

Figure 24:
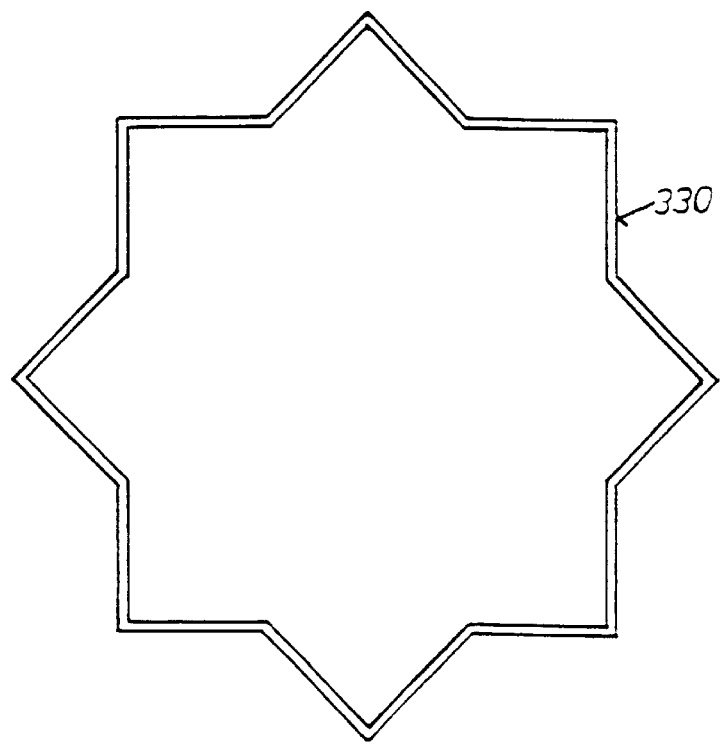
FIG. 24 shows a plan view of the basic shape of a modified baking frame.
Figure 25:
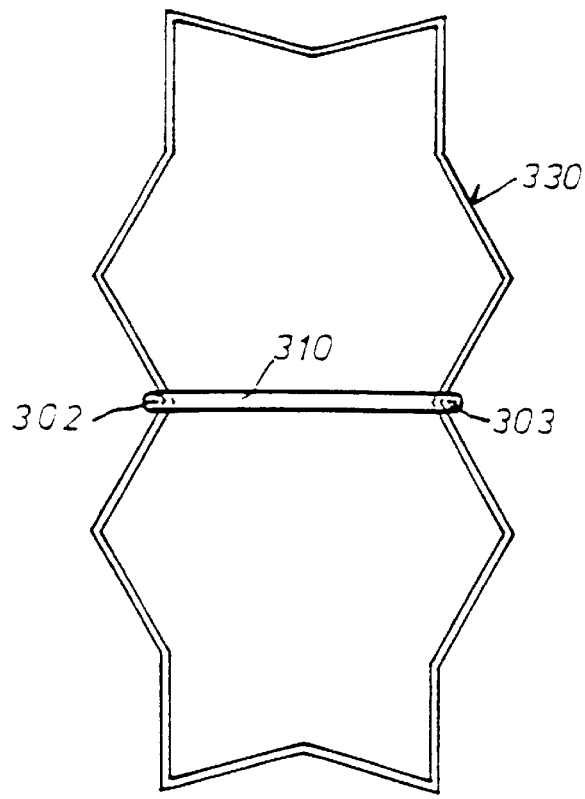
FIG. 25 shows a plan view of a modified exemplary embodiment.

FIG. 24 shows a baking frame (330) which is in the form of a star and has an essentially round basic shape. According to FIG. 25, the shape of the baking frame (330) is changed by the bracket (310) with its legs (302, 303) such that an essentially rectangular basic shape is provided. This elongate form of the baking frame (330) can be used, for example, as a tin for baking Stollen.

Figure 26:
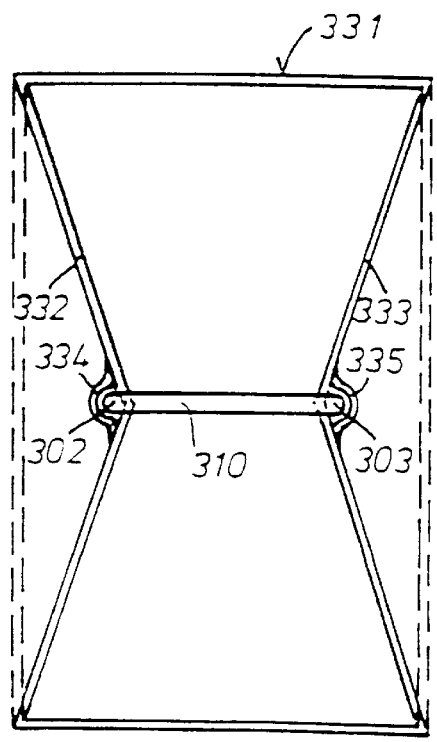
FIG. 26 shows a plan view of a further exemplary embodiment.

FIG. 26 shows a baking frame (331) which, by way of the bracket (310), has a shape which is modified with respect to the originally rectangular shape, which is represented by dashed lines.

The bracket (310) grips on side surfaces (332, 333) of the frame (331) by means of its legs (302, 303). In order that the bracket (310) is fixed in the center of the side surfaces (332, 333) and does not slip off, the baking frame (331) has retaining means (334, 335) for the legs (302, 303) of the bracket (310).

Figure 27:
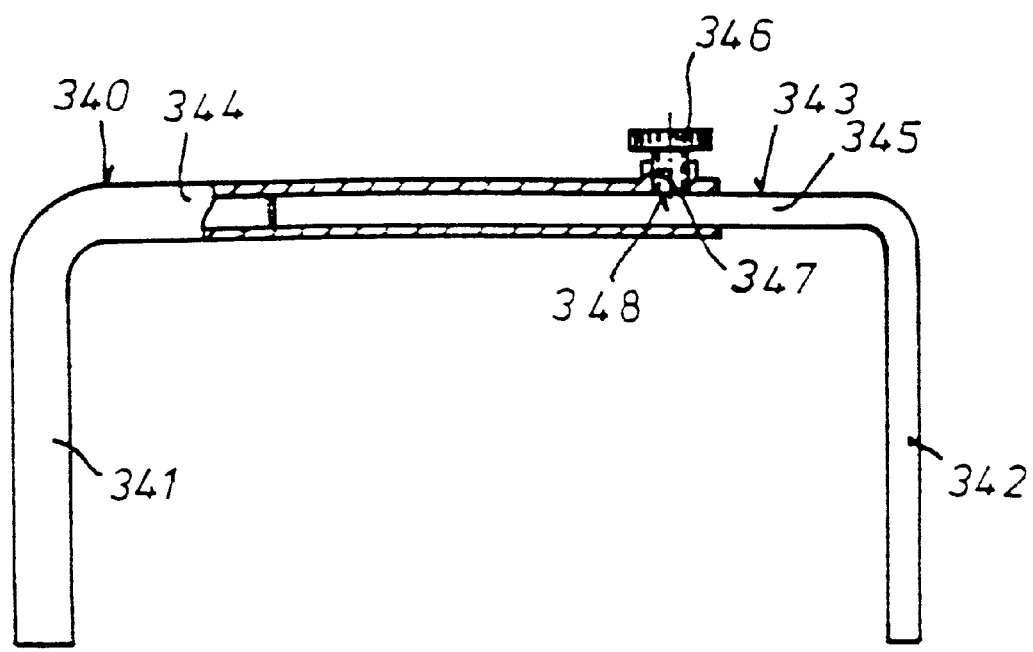
FIG. 27 shows a longitudinal section through an adjustable bracket.

FIG. 27 shows a bracket (340) with legs (341, 342) and a base side (343). The base side (343) is designed in two parts. The part (344) is of a hollow design, with the result that the part (345) can be arranged in the part (344). The part (345) of the base side (343) is arranged displaceably in the part (344), with the result that the base side (343) of the bracket (340) can be varied in length. In order to secure the bracket (344) with a specific length of the base side (343), an adjustment screw (346) is provided, this screw engaging through a threaded bore (347) and resting on the part (345) of the base side (343) by means of its end (348). If the adjustment screw (346) is screwed into the threaded bore, then it presses on the part (345) of the base side (343) and fixes said part (345) in the part (344) of the base side (343).

I claim:

1. An apparatus for baking a cake mix, the baking apparatus comprising:

an oven grating including a substantially planar cake mix supporting top surface having through-passages and webs, border portions of the oven grating extending at an angle downwards with respect to the planar cake mix supporting top surface and defining a side also having through-passages and webs;

a baking frame for laterally bounding the cake mix, the baking frame being supported on the planar cake mix supporting top surface of the oven grating; and baking foil being inserted between the planar cake mix supporting top surface of the oven grating and the baking frame.

2. An apparatus for baking cake mix, the baking apparatus comprising:

an oven grating made from a metal sheet and having a plurality of perforations therethrough, the metal sheet having a central portion including a substantially planar cake mix supporting top surface and at least one peripheral border portion, the at least one border portion extending at an angle downward with respect to the planar cake mix supporting top surface of the central portion thereby defining a side also having perforations, and wherein the size of the perforations is relatively great with respect to the size of webs provided between relatively adjacent perforations.

3. An apparatus for baking cake mix, the baking apparatus comprising:

an oven grating for supporting the cake mix; and a baking frame for adjusting the cake mix size and shape, the baking frame resting on the oven grating and having at least one graduated scale on a surface thereof for setting the size.

4. A process for baking cake mix in an oven, the baking process comprising:

laying baking foil on a substantially planar cake mix supporting top surface of an oven grating having through-passages and webs, wherein the oven grating having border portions extending at an angle downwards from the planar cake mix supporting top surface for defining a side also having through-passages and webs;

supporting a baking frame on the planar cake mix supporting top surface of the oven grating so as to interpose the baking foil between the baking frame and the planar cake mix supporting top surface of the oven grating;

introducing the cake mix in a space bounded laterally by the baking frame and bounded from below by the baking foil laid on the planar cake mix supporting top surface of the oven grating; and baking the cake mix in the oven.

5. The baking process according to claim 4, further comprising:
adjusting the baking frame size.

6. The baking process according to claim 4, further comprising:
adjusting the baking frame shape.

7. The baking apparatus according to claim 3, wherein the oven grating includes a substantially planar cake mix supporting top surface and at least one peripheral border portion extending at an angle downward with respect to the planar cake mix supporting top surface.

8. The baking apparatus according to claim 1, wherein the baking frame has through-passages and webs.

9. The baking apparatus according to claim 1, wherein the side runs around the oven grating without interruption.

10. The baking apparatus according to claim 1, wherein the through-passages have a circular or a regular hexagonal shape.

11. The baking apparatus according to claim 1, wherein the area of the through-passages in the oven grating is relatively great with respect to the area of the webs in the oven grating.

12. The baking apparatus according to claim 1, wherein at least one of the border portions is bent along a web so as to form the angle of the oven grating.

13. The baking apparatus according to claim 1, wherein the border portions are welded to one another at corners of the oven grating.

14. The baking apparatus according to claim 1, wherein the oven grating has a rectangular or circular shape.

15. The baking apparatus according to claim 1, wherein the baking frame has a circular or rectangular shape.

16. The baking apparatus according to claim 1, wherein the baking frame is adjustable in size.

17. The baking apparatus according to claim 16, wherein the baking frame has at least one graduated scale for sizing the adjustable baking frame.

18. The baking apparatus according to claim 17, wherein the baking frame has a graduated scale on its outer surface.

19. The baking apparatus according to claim 16, wherein the baking frame has mutually overlapping side surfaces for the size adjustment.

20. The baking apparatus according to claim 16, wherein the baking frame comprises four segments.

21. The baking apparatus according to claim 20, wherein the baking frame segments each comprise two side surfaces which are at right angles with respect to one another.

22. The baking apparatus according to claim 20, wherein one side surface of each pair of adjacent segments overlap for rectangularly forming the cake mix.

23. The baking apparatus according to claim 19, further comprising clamps for connecting the mutually overlapping side surfaces.

24. The baking apparatus according to claim 23, wherein one clamp is connected fixedly to one of the two mutually overlapping side surfaces.

25. The baking apparatus according to claim 24, wherein the one clamp is arranged at an end of the one side surface.

26. The baking apparatus according to claim 1, wherein at least one of the baking frame and the oven grating are made of special steel, normal steel, spring steel, stainless steel or of heat-resistant plastic.

27. The baking apparatus according to claim 1, wherein at least one of the baking frame and the planar cake mix supporting top surface of the oven grating have a non-stick coating.

28. The baking apparatus according to claim 1, wherein at least one of the baking frame and the planar cake mix supporting top surface of the oven grating are coated with TEFLON.

29. The baking apparatus according to claim 1, wherein the planar cake mix supporting top surface of the oven grating has a relatively greater surface area than that of the baking frame.

30. The baking apparatus according to claim 2, wherein the border portion encircles the planar portion without interruption.

31. The baking apparatus according to claim 2, wherein the perforations have a circular or regular hexagonal shape.

32. The baking apparatus according to claim 31, wherein the at least one border portion is bent with respect to the central portion along a web of the metal sheet.

33. The baking apparatus according to claim 2, wherein adjacent edges of the at least one side portions are welded to one another at corners of the central portion.

34. The baking apparatus according to claim 2, wherein the metal sheet consists of special steel, normal steel or of heat-resistant plastic.

35. The baking apparatus according to claim 34, wherein at least one of the baking frame and the planar cake mix supporting top surface of the oven grating have a non-stick coating.

36. The baking apparatus according to claim 35, wherein at least one of the baking frame and the planar cake mix supporting top surface of the oven grating are coated with TEFLON.

37. The cake baking apparatus according to claim 2, further comprising: a surround supported on the planar cake mix supporting top surface of the oven grating.

38. The baking apparatus according to claim 37, wherein the surround comprises a side ring of a cake tin.

39. The baking apparatus according to claim 37, wherein the surround has perforations.

40. The baking apparatus according to claim 2, wherein the metal sheet has a rectangular shape.

41. The baking apparatus according to claim 2, wherein the metal sheet has a circular shape.

42. The baking apparatus according to claim 3, wherein the baking frame has length-adjustable sides and forms a rectangular shaped cake mix.

43. The baking apparatus according to claim 3, wherein the baking frame forms a circular shaped cake mix.

44. The baking apparatus according to claim 3, wherein the graduated scale is arranged on an outer surface of the baking frame.

45. The baking apparatus according to claim 3, wherein the braking frame has mutually overlapping side surfaces for adjusting the cake mix size.

46. The baking apparatus according to claim 42, wherein the baking frame comprises four segments each having two side surfaces at right angles with respect to one another.

47. The baking apparatus according to claim 42, wherein the baking frame comprises four segments and one side surface of each pair of adjacent segments overlap for rectangularly forming the cake mix.

48. The baking apparatus according to claim 47, wherein at least one clamp is provided for connecting each pair of mutually overlapping side surfaces and is fixed with respect to one of the two mutually overlapping side surfaces.

49. The baking apparatus according to claim 47, wherein at least one clamp is provided for connecting each pair of mutually overlapping side surfaces and is fixed at an end of the one of the two mutually overlapping side surface.

50. The baking apparatus according to claim 3, wherein the baking frame is made of special steel, normal steel, spring steel, stainless steel or heat-resistant plastic.

51. The baking apparatus according to claim 3, wherein the baking frame has a non-stick coating.

52. The baking apparatus according to claim 51, wherein the baking frame is coated with TEFLON.

53. The baking apparatus according to claim 3, wherein the oven grating has a relatively greater surface area than that of the baking frame.

54. A process for baking cake mix in an oven, the baking process comprising:

supporting a baking frame on top of an oven grating;

changing the shape of the baking frame with at least one bracket;

introducing the cake mix in a space bounded laterally by the baking frame and bounded from below by the oven grating; and baking the cake mix in the oven.

55. The baking process according to claim 54, wherein at least one bracket comprises two legs and a base side.

56. The baking process according to claim 55, wherein the legs of at least one bracket rest against outer surfaces of the baking frame.

57. The baking process according to claim 54, wherein the baking frame is closed of spring band steel.

58. The baking process according to claim 55, further comprising a plurality of the brackets having different base-side lengths.

59. The baking process according to claim 55, further comprising:

adjusting the base-side length of at least one bracket.

60. The baking process according to claim 55, wherein the legs of at least one bracket are of a length corresponding to at least a height of the baking frame.

61. The baking process according to claim 54, wherein the baking frame has the shape of a circle, rectangle, star, or rosette.

62. The baking process according to claim 55, wherein the baking frame comprises a receiver for the legs of at least one bracket.

63. The baking process according to claim 54, further comprising:

adjusting the baking frame size.

64. The baking process according to claim 54, wherein the oven grating comprises webs and through-passages.

65. The baking process according to claim 54, further comprising:

placing baking foil between the baking frame and the oven grating.

66. The baking process according to claim 2, wherein the perforations have a rectangular shape.

67. The baking process according to claim 54, wherein the oven grating includes a substantially planar cake mix supporting top surface and at least one peripheral border portion extending at an angle downward with respect to the planar cake mix supporting top surface.

* * * * *